United States Patent
Akin

(10) Patent No.: US 11,999,023 B2
(45) Date of Patent: Jun. 4, 2024

(54) APPLICATION DEVICE, ROBOT, PRODUCTION SYSTEM AND METHOD FOR JOINING ADHESIVE-TAPE PORTIONS

(71) Applicant: tesa SE, Norderstedt (DE)

(72) Inventor: Deniz Nick Akin, Hamburg (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 18/547,575

(22) PCT Filed: Feb. 24, 2022

(86) PCT No.: PCT/EP2022/054655
§ 371 (c)(1),
(2) Date: Aug. 23, 2023

(87) PCT Pub. No.: WO2022/180164
PCT Pub. Date: Sep. 1, 2022

(65) Prior Publication Data
US 2024/0131643 A1    Apr. 25, 2024

(30) Foreign Application Priority Data
Feb. 24, 2021   (DE) .......................... 102021201752.5

(51) Int. Cl.
*B23P 19/04* (2006.01)
*B25J 15/06* (2006.01)

(52) U.S. Cl.
CPC ......... *B23P 19/047* (2013.01); *B25J 15/0616* (2013.01)

(58) Field of Classification Search
CPC ........................... B25J 15/0616; B23P 19/047
See application file for complete search history.

(56) References Cited

U.S. PATENT DOCUMENTS

2020/0281079 A1    9/2020   Thomas

FOREIGN PATENT DOCUMENTS

DE    3906278 A1    8/1990
DE    9106710 U1   11/1991
(Continued)

OTHER PUBLICATIONS

German Patent & Trademark Office, Office Action, German Patent Application No. 102021201752.5, Feb. 14, 2022, 4 pages.
(Continued)

*Primary Examiner* — Moshe Wilensky
(74) *Attorney, Agent, or Firm* — Price Heneveld LLP

(57) ABSTRACT

An application device for joining adhesive-tape sections that includes: a holder assembly having a plurality of holding devices that are movable relative to one another, each holding device configured to hold an adhesive-tape section such that a first main joining surface, a first end joining surface, and a second end joining surface of the adhesive-tape section are exposed; and a plurality of actuators. Further, each of the holding devices is configured for movement between first and second joining configurations. In the first joining configuration, each holding device holds an adhesive-tape section and each of the adhesive-tape sections are spaced apart from one another. In the second joining configuration, each holding device holds an adhesive-tape section wherein the first end joining surface of the adhesive-tape section bears against the second end joining surface of another adhesive-tape section, thus defining a continuous and closed adhesive adhesive-tape web.

20 Claims, 8 Drawing Sheets

(56) References Cited

FOREIGN PATENT DOCUMENTS

| | | | |
|---|---|---|---|
| DE | 102011111377 B3 | 1/2013 |
| DE | 102021201752 B4 | 5/2023 |
| EP | 1247638 A1 | 10/2002 |
| EP | 2011757 A1 | 1/2009 |
| JP | 2003120815 A | 4/2003 |

OTHER PUBLICATIONS

German Patent & Trademark Office, Office Action, German Patent Application No. 102021201752.5, Feb. 14, 2022, 7 pages.

APPLICATION DEVICE, ROBOT, PRODUCTION SYSTEM AND METHOD FOR JOINING ADHESIVE-TAPE PORTIONS

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/EP2022/054655, filed on Feb. 24, 2022, designating the United States of America, which in turn claims the benefit of priority under 35 U.S.C. §§ 119, 365 of German Patent Application No. 102021201752.5, filed Feb. 24, 2021, the contents of which are relied upon and incorporated herein by reference in their entirety.

FIELD OF THE DISCLOSURE

The present invention relates to an application device, a robot, a manufacturing system, and a method for joining adhesive-tape sections.

BACKGROUND

Application devices are known from the prior art. With the help of these application devices, one-piece sealing elements produced by punching, for example, are adhered to substrates. These sealing elements have an underside and an upper side. The underside in this case forms a first main joining surface, and the upper side forms a second main joining surface. The sealing elements can be adhered to a first substrate with their first main joining surface. Subsequently, a second substrate can be adhered to the second main joining surfaces of the sealing elements. With the help of the sealing elements, the two substrates can thereby be connected to one other. In particular, a one-piece sealing element produced by punching can be shaped in such a way that when the first main joining surface is connected to a first substrate and the second main joining surface is connected to a second substrate, a cavity is formed between the two substrates which is enclosed by the two substrates and the sealing element in such a manner that the two substrates and the sealing element seal the cavity from the environment of the two substrates and the sealing element.

In general, it is desirable for a particularly advantageous sealing effect to be provided in a particularly resource-efficient manner.

The object of the present invention is therefore to provide a particularly advantageous sealing effect in a particularly resource-efficient manner.

SUMMARY OF THE DISCLOSURE

According to an aspect of the disclosure, an application device for joining adhesive-tape sections is provided that includes: a holder assembly having a plurality of holding devices that are movable relative to one another, wherein each holding device is configured to hold an adhesive-tape section in such a way that a first main joining surface, a first end joining surface, and a second end joining surface of the adhesive-tape section are exposed; and a plurality of actuators. The holder assembly is configured for movement between a receiving position and an application position. Further, each of the holding devices is configured for movement between a first joining configuration and a second joining configuration by one of the actuators. Each adhesive-tape section comprises an adhesive-tape underside, an adhesive-tape upper side, the first main joining surface, and a second main joining surface. The first and second main joining surfaces run parallel to one another and extend between a first end and a second end, the first main joining surface defined by the underside and the second main joining surface defined by the upper side. Further, the first end comprises the first end joining surface, arranged transversely to the first and second main joining surfaces, and the second end comprises the second end joining surface, arranged transversely to the first and second main joining surfaces, wherein each of the first and second end joining surfaces extends between the first and second main joining surfaces. In the first joining configuration, the holding devices are arranged such that each holding device holds an adhesive-tape section and each of the adhesive-tape sections are arranged spaced apart from one another. In addition, in the second joining configuration, the holding devices are arranged such that each holding device holds an adhesive-tape section wherein the first end joining surface of the adhesive-tape section bears against the second end joining surface of another adhesive-tape section and the first main joining surface faces an application direction, thus joining the adhesive-tape sections to define a continuous and closed adhesive adhesive-tape web.

According to another aspect of the disclosure, a robot is provided that includes: a frame; and an application device according to the foregoing aspect. Further, the application device is mounted on the frame.

According to another aspect of the disclosure, a manufacturing system is provided that includes: a robot; and a dispensing device. The robot comprises a frame and an application device according to the foregoing aspect. The application device is mounted on the frame. Further, the dispensing device is configured to provide each of the adhesive-tape sections.

According to another aspect of the disclosure, a method for joining adhesive-tape sections with an application device is provided wherein each adhesive-tape section comprises an adhesive-tape underside, an adhesive-tape upper side, a first main joining surface, and a second main joining surface. Further, the application device includes: a holder assembly having a plurality of holding devices that are movable relative to one another, wherein each holding device is configured to hold an adhesive-tape section in such a way that the first main joining surface, a first end joining surface, and a second end joining surface of the adhesive-tape section are exposed; and a plurality of actuators, wherein the holder assembly is configured for movement between a receiving position and an application position. In particular, the method includes the following steps: holding the adhesive-tape sections with the plurality of holding devices, so that for each adhesive-tape section, the first main joining surface, the first end joining surface, and the second end joining surface are exposed; and moving the plurality of holding devices with the plurality of actuators from a first joining configuration to a second joining configuration. The first joining configuration is such that the holding devices are arranged such that each holding device holds an adhesive-tape section and each of the adhesive-tape sections are arranged spaced apart from one another. The second joining configuration is such that each holding device holds an adhesive-tape section wherein the first end joining surface of the adhesive-tape section bears against the second end joining surface of another adhesive-tape section and the first main joining surface faces an application direction. Further, the moving step is conducted to join the adhesive-tape sections to define a continuous and closed adhesive-tape web.

DETAILED DESCRIPTION

Figure 1:
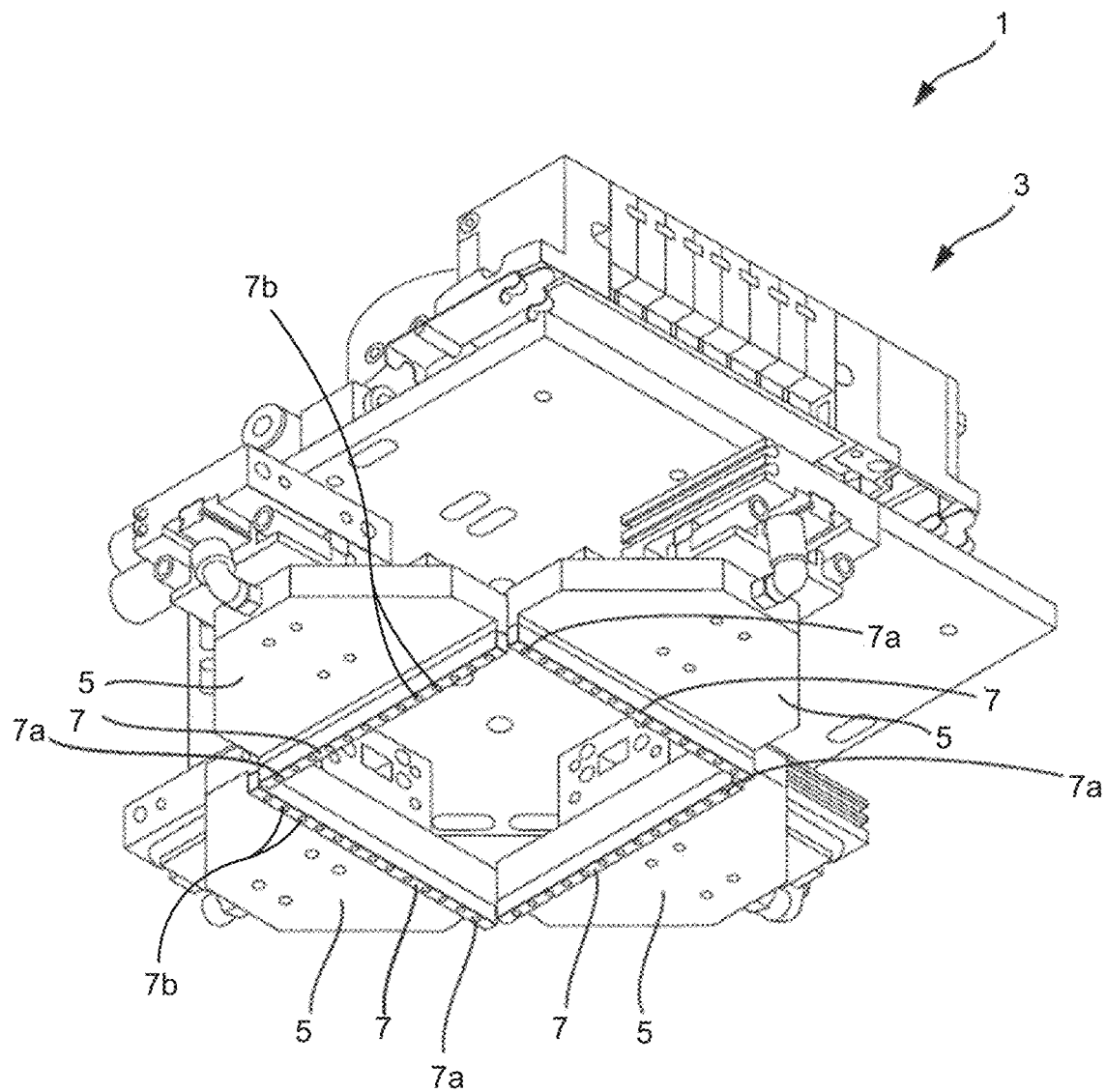
FIG. 1 shows a schematic view of an embodiment of an application device, according to an aspect of the disclosure.

Furthermore, it should be noted that "comprising" does not exclude other elements or steps, and "a" or "an" does not exclude a plurality. It should also be noted that features described with reference to one of the above or the following exemplary embodiments can also be used in combination with other features of other exemplary embodiments described above or in the following sections.

Further features, advantages, and application possibilities of the present invention are evident from the following description of the exemplary embodiments and figures. All features described and/or depicted, individually and in any combination, form the subject matter of the invention, also independently of their composition in the individual claims or their appendices. Furthermore, in the figures, identical reference signs represent identical or similar objects.

According to a first aspect of the invention, the aforementioned object is achieved by an application device. The application device is designed for joining adhesive-tape sections. The adhesive-tape sections each have an adhesive-tape underside and an adhesive-tape upper side. Furthermore, the adhesive-tape sections each have two adhesive main joining surfaces running parallel to one another, a first main joining surface of which is formed by the adhesive-tape underside and a second main joining surface is formed by the adhesive-tape upper side. The adhesive-tape sections also each extend from a first end to a second end. An adhesive first end joining surface arranged transversely to the main joining surfaces is provided at the first end. An adhesive second end joining surface arranged transversely to the main joining surfaces is provided at the second end. The first end joining surface and the second end joining surface also extend from the first main joining surface to the second main joining surface. Furthermore, the application device has a holder assembly. The holder assembly has holding devices that are movable relative to one other. Each holding device of the holding devices can hold an adhesive-tape section of the adhesive-tape sections in such a way that a first main joining surface of the main joining surfaces, the first end joining surface, and the second end joining surface of the adhesive-tape section are exposed. The holder assembly can be moved between a receiving position and an application position. The holding devices can be moved between a first joining configuration and a second joining configuration with the help of an actuator. In the first joining configuration, the holding devices are arranged in such a manner that when each holding device of the holding devices holds an adhesive-tape section of the adhesive-tape sections, the adhesive-tape sections are arranged spaced apart from one another. In the second joining configuration, the holding devices are arranged in such a manner that when each holding device of the holding devices holds an adhesive-tape section of the adhesive-tape sections, each first end joining surface bears against a second end joining surface in such a manner that a first end joining surface bears against each second end joining surface, the first main joining surfaces face in an application direction, and the adhesive-tape sections form a continuous and closed adhesive adhesive-tape web.

The application device is designed for joining adhesive-tape sections. The application device can be attached to a frame of a robot. In particular, it is provided that the adhesive-tape sections can be joined with the help of the application device in such a manner that they are connected to one another after joining. The adhesive-tape sections may be adhesive-tape sections of an adhesive tape that has been at least partially picked up from an adhesive tape roll and has been separated in sections, in order to form the adhesive-tape sections by separation.

The adhesive-tape sections each have an adhesive tape underside and an adhesive tape upper side. Consequently, each adhesive-tape section has an adhesive tape underside and an adhesive tape upper side. In the event that the adhesive-tape sections are adhesive-tape sections of an adhesive tape that has been unrolled at least in part from an adhesive tape roll and has been separated at least in sections, in order to form the adhesive-tape sections by separation, the adhesive tape undersides of the adhesive-tape sections can face radially inwardly and the adhesive tape upper sides of the adhesive-tape sections can face radially outwardly with respect to a radial direction of the adhesive tape roll prior to unrolling and prior to separating.

Furthermore, the adhesive-tape sections each have two adhesive main joining surfaces running parallel to one another, a first main joining surface of which is formed by the adhesive-tape underside and a second main joining surface is formed by the adhesive-tape upper side. The adhesive nature of the main joining surfaces ensures that when a main joining surface of the main joining surfaces bears against a surface of an object, such as a surface of a substrate, for example, a cohesive connection can be established between the main joining surface and the surface of the object. An adhesive-tape section which has two adhesive main joining surfaces running parallel to one another, a first main joining surface of which is formed by the adhesive-tape underside and a second main joining surface is formed by the adhesive-tape upper side, can also be referred to as a section of a double-sided adhesive tape. This section can also be referred to as a double-sided adhesive-tape section.

Furthermore, the adhesive-tape sections each extend from a first end to a second end. In particular, it is provided that each adhesive-tape section extends from the first end towards a longitudinal direction of the adhesive-tape section to the second end. The extent of each adhesive-tape section in the longitudinal direction is preferably greater than the extent of each adhesive-tape section perpendicular to the longitudinal direction. Particularly preferably, the extent of each adhesive-tape section in the longitudinal direction corresponds to at least twice the extent of the adhesive-tape section perpendicular to the longitudinal direction.

An adhesive first end joining surface arranged transversely to the main joining surfaces is provided at the first end. The adhesive nature of the first end joining surface ensures that when said first end joining surface bears against a surface of an object, such as a surface of a substrate, for example, a cohesive connection can be established between the first end joining surface and the surface of the object. In connection with the present invention, the adhesive nature of the first end joining surface ensures, in particular, that a cohesive connection can be established between the first end joining surface and the second end joining surface. In particular, due to the adhesive nature of the first end joining surface, a cohesive connection can be established between the first end joining surface of a first adhesive-tape section and the second end joining surface of a second adhesive-tape section. This applies in particular to each adhesive-tape section, so that each first end joining surface of the adhesive-tape sections can bear against a second end joining surface of the adhesive-tape sections, in such a manner that a first end joining surface bears against each second end joining surface and, in particular, due to the adhesive nature of the first end joining surface in each pair of adjacent adhesive-tape sections, in particular within the continuous and closed adhesive-tape web, a cohesive connection can be established between the first end joining surface of a first adhesive-tape section of each pair of adjacent adhesive-tape sections and the second end joining surface of a second adhesive-tape section of the pair of adjacent adhesive-tape sections. This cohesive connection ensures sealing and prevents fluid communication between the first end joining surface and the second end joining surface of two adjacent adhesive-tape sections in the adhesive adhesive-tape web.

The first end joining surface is arranged transversely to the main joining surfaces. In particular, due to the fact that the first end joining surface is arranged transversely to the main joining surfaces, each main joining surface of the main joining surfaces forms an angle of less than 180° to the first end joining surface. The first end joining surface is preferably arranged transversely to the main joining surfaces, in such a manner that said first end joining surface forms a 90° angle with each of the main joining surfaces. In this case, it is preferable for the first end joining surface to have a surface normal extending in the longitudinal direction of the adhesive-tape section. Alternatively, the first end joining surface may have a surface normal extending at an angle to the longitudinal direction of the adhesive-tape section. It is particularly preferable for the first end joining surface to be arranged transversely to the main joining surfaces, in such a manner that said first end joining surface forms a 90° angle with each of the main joining surfaces, and the surface normal of the first end joining surface extends at an angle of 45° to the longitudinal direction of the adhesive-tape section.

An adhesive second end joining surface arranged transversely to the main joining surfaces is provided at the second end. The adhesive nature of the second end joining surface ensures that when said second end joining bears against a surface of an object, such as a surface of a substrate, for example, a cohesive connection can be established between the second end joining surface and the surface of the object. In connection with the present invention, the adhesive nature of the second end joining surface ensures, in particular, that a cohesive connection can be established between the second end joining surface and the first end joining surface. In particular, due to the adhesive nature of the second end joining surface, a cohesive connection can be established between the first end joining surface of a first adhesive-tape section and the second end joining surface of a second adhesive-tape section. This applies in particular to each adhesive-tape section, so that each first end joining surface of the adhesive-tape sections can bear against a second end joining surface of the adhesive-tape sections, in such a manner that a first end joining surface bears against each second end joining surface and, in particular, due to the adhesive nature of the second end joining surface in each pair of adjacent adhesive-tape sections, in particular within the continuous and closed adhesive-tape web, a cohesive connection can be established between the first end joining surface of a first adhesive-tape section of each pair of adjacent adhesive-tape sections and the second end joining surface of a second adhesive-tape section of the pair of adjacent adhesive-tape sections. This cohesive connection ensures sealing and prevents fluid communication between the first end joining surface and the second end joining surface of two adjacent adhesive-tape sections in the adhesive adhesive-tape web. The combination of the adhesive nature of the first end joining surface and the adhesive nature of the second end joining surface, in particular, ensures a particularly sealed cohesive connection, so that fluid communication between the first end joining surface and the second end joining surface of two adjacent adhesive-tape sections in the adhesive adhesive-tape web can be particularly effectively prevented.

The second end joining surface is arranged transversely to the main joining surfaces. In particular, due to the fact that the second end joining surface is arranged transversely to the main joining surfaces, each main joining surface of the main joining surfaces forms an angle of less than 180° to the first end joining surface. The second end joining surface is preferably arranged transversely to the main joining surfaces, in such a manner that said second end joining surface forms a 90° angle with each of the main joining surfaces. In this case, it is preferable for the second end joining surface to have a surface normal extending in the negative longitudinal direction of the adhesive-tape section. Alternatively, the second end joining surface may have a surface normal extending at an angle to the negative longitudinal direction of the adhesive-tape section. It is particularly preferable for the second end joining surface to be arranged transversely to the main joining surfaces, in such a manner that said second end joining surface forms a 90° angle with each of the main joining surfaces, and the surface normal of the second end joining surface extends at an angle of 45° to the negative longitudinal direction of the adhesive-tape section. The negative longitudinal direction is preferably oriented in the opposite direction to the longitudinal direction, so that when the negative longitudinal direction and the longitudinal direction are represented as vectors, the two vectors are the same except for being oriented in the opposite direction to one another, in particular that the two vectors have the same starting point and form a 180° angle between them.

Furthermore, the first end joining surface and the second end joining surface extend from the first main joining surface to the second main joining surface. The first end joining surface extends from the first main joining surface to the second main joining surface. The extent of the first end joining surface from the first main joining surface to the second main joining surface ensures that when the first end joining surface bears against a second end joining surface, the interface between the first end joining surface and the second end joining surface extends from the first main joining surface to the second main joining surface. In particular, the extent of the first end joining surface from the first main joining surface to the second main joining surface enables a cohesive connection to extend from the first main joining surface to the second main joining surface when a cohesive connection is made between the first end joining surface and the second end joining surface. The cohesive connection from the first main joining surface to the second main joining surface ensures, particularly when the first main joining surface is connected to a first substrate and the second main joining surface is connected to a second substrate, that a seal can be provided for the entire area between the first main joining surface and the second main joining surface. In particular, a seal for the entire area between the first main joining surface and the second main joining surface between two adhesive-tape sections in the region of the first end joining surface of a first adhesive-tape section of the two adhesive-tape sections and the second end joining surface of a second adhesive-tape section of the two adhesive tape sections can ensure reliable sealing of a cavity between two substrates from the environment in the region between two adhesive-tape sections.

The second end joining surface also extends from the first main joining surface to the second main joining surface. The extent of the second end joining surface from the first main joining surface to the second main joining surface ensures that when the second end joining surface bears against a first end joining surface, the interface between the first end joining surface and the second end joining surface extends from the first main joining surface to the second main joining surface. In particular, the extent of the second end joining surface from the first main joining surface to the second main joining surface enables a cohesive connection to extend from the first main joining surface to the second main joining surface when a cohesive connection is made between the first end joining surface and the second end joining surface. The cohesive connection of the first main joining surface to the second main joining surface ensures that when the first main joining surface is connected to a first substrate and the second main joining surface is connected to a second substrate, a seal can be provided for the entire area between the first main joining surface and the second main joining surface. In particular, a seal for the entire area between the first main joining surface and the second main joining surface between two adhesive-tape sections in the region of the first end joining surface of a first adhesive-tape section of the two adhesive-tape sections and the second end joining surface of a second adhesive-tape section of the two adhesive-tape sections can ensure reliable sealing of a cavity between two substrates from the environment in the region between two adhesive-tape sections.

Furthermore, the application device comprises a holder assembly. The holder assembly comprises the holding devices. The holding devices are movable relative to one another. The holding devices can therefore be moved relative to one another. In addition, the holder assembly may have a base plate, in which a guide is provided for each holding device, along which the corresponding holding device can be moved. As already described, the application device can be attached to a frame of a robot. For example, a robot arm of the robot may be attached to the frame of the robot, and in turn, the robot arm may be attached to the base plate, enabling the application device to be moved with the help of the robot arm.

Each holding device of the holding devices can hold an adhesive-tape section of the adhesive-tape sections, in such a way that a first main joining surface of the main joining surfaces, the first end joining surface, and the second end joining surface of the adhesive-tape section are exposed. Since each holding device is able to hold an adhesive-tape section of the adhesive-tape sections, in such a manner that the first main joining surface of the main joining surfaces and the first end joining surface and the second end joining surface are exposed, it is ensured that with the help of the holding device, each adhesive-tape section held by a holding device can be brought into contact with a surface of an object with its first main joining surface, with its first end joining surface, and with its second end joining surface. The ability of each holding device to hold the corresponding adhesive-tape section in such a manner that the first main joining surface, the first end joining surface, and the second end joining surface are exposed, enables the adhesive-tape section to be connected to a surface of a first substrate with its first main joining surface, to be connected to a second end joining surface of another adhesive-tape section with its first end joining surface, and to be connected to a first end joining surface of a further adhesive-tape section with its second end joining surface, in particular while the adhesive-tape section is being held by the holding device.

The holder assembly can be moved between a receiving position and an application position. In the receiving position, the adhesive-tape sections can be received by the holder assembly with the help of the holding devices, such that each holding device holds one adhesive-tape section after the adhesive-tape sections have been picked up. With the adhesive-tape sections received, the holder assembly can be moved from the receiving position into the application position. In the application position, the adhesive-tape sections can be applied to a substrate with the help of the holder assembly, in that the holding devices press the adhesive-tape sections onto the substrate and then release the adhesive-tape sections, so that when the holder assembly is moved back from the application position, the adhesive-tape sections remain on the substrate.

The holding devices can be moved between a first joining configuration and a second joining configuration with the help of an actuator. This allows the holding devices to be moved from the first joining configuration into the second joining configuration and from the second joining configuration into the first joining configuration. The application device has an actuator for moving the holding devices. The application device may also have multiple actuators for moving the holding device. One actuator of the multiple actuators may be assigned to each holding device, for example, so that the holding devices can be moved relative to one another independently of one another. The actuator or actuators may have a pneumatic cylinder. The actuator or the actuators may be connected to the base plate.

In the first joining configuration, the holding devices are arranged in such a way that when each holding device of the holding devices holds an adhesive-tape section of the adhesive-tape sections, the adhesive-tape sections are arranged spaced apart from one another. The fact that the holding devices are arranged in such a manner in the first joining configuration, that when each holding device of the holding devices holds an adhesive-tape section of the adhesive-tape sections, the adhesive-tape sections are arranged spaced apart from one another, means that the adhesive-tape sections can be received without touching one another. Consequently, in the first joining configuration, a cohesive bond between the adhesive-tape sections can be avoided. In particular, it is provided that when the holder assembly is in the receiving position, the holding devices are in the first joining configuration.

In the second joining configuration, the holding devices are arranged in such a manner that when each holding device of the holding devices holds an adhesive-tape section of the adhesive-tape sections, each first end joining surface bears against a second end joining surface in such a manner that a first end joining surface bears against each second end joining surface, the first main joining surfaces face in an application direction, and the adhesive-tape sections form a continuous and closed adhesive-tape web. The second joining configuration ensures that the adhesive-tape sections are joined together in such a manner that the adhesive tape sections form the continuous and closed adhesive-tape web. Particularly when the adhesive-tape sections form the continuous and closed adhesive-tape webs, before the holder assembly is in the application position, the continuous and closed adhesive-tape web can be formed before the adhesive-tape sections bear against a surface of a substrate with the first main joining surfaces. Consequently, the adhesive-tape sections can be connected to one another in the second joining configuration, without adhesive forces from the substrate acting on the first main joining surfaces of the adhesive-tape sections. The adhesive-tape sections can also be optimally positioned relative to one another in the second joining configuration, so that the continuous and closed adhesive-tape web provides an advantageous sealing effect, particularly at the interfaces between the first end joining surfaces and the second end joining surfaces, in particular when the continuous and closed adhesive-tape web is used to seal a cavity between two substrates in respect of the environment.

Due to the fact that in the second joining configuration, each first end joining surface bears against a second end joining surface, and a first end joining surface bears against each second end joining surface, cohesive connections to be made between pairs of first and second end joining surfaces of different adhesive-tape sections in each case. These cohesive connections ensure a seal between all pairs of first and second end joining surfaces. Furthermore, in the second joining configuration, the first main joining surfaces of the adhesive-tape sections face in the application direction. In particular, the fact that the first main joining surfaces of the adhesive-tape sections face in the application direction means that the adhesive-tape sections can be applied to the surface of a substrate, for example, by moving said adhesive-tape sections in the direction of the application direction, thereby cohesively bonding them to this material. In particular, the fact that the first main joining surfaces of all adhesive-tape sections face in the application direction means that all adhesive-tape sections can be applied to the surface of the substrate together, in particular simultaneously. The fact that all adhesive-tape sections can be applied to the surface of the substrate together, in particular simultaneously, means that the application of the adhesive-tape sections to the substrate can be carried out in a particularly time-efficient manner. Moreover, in the second joining configuration, the adhesive-tape sections form the continuous and closed adhesive-tape web. The adhesive-tape web therefore comprises the adhesive-tape sections, each adhesive-tape section's first end joining surface bearing against a second end joining surface of a first adjacent adhesive-tape section, and its second end joining surface bearing against a first end joining surface of a second adjacent adhesive-tape section. The adhesive-tape web is continuous. The fact that the adhesive-tape web is continuous means that it can enclose a cavity between two substrates and the adhesive-tape web itself, if the adhesive-tape web is arranged between two substrates, for example. The continuous adhesive-tape web can therefore provide a seal between the cavity and the environment, in particular the environment of the adhesive-tape web and the two substrates. The adhesive-tape web is closed. The fact that the adhesive-tape web is closed means that the adhesive-tape web forms a cohesive and uninterrupted structure which can provide a continuous seal for the cavity in respect of the environment. Particularly when the holder assembly is in the application position, the holding devices are in the second joining configuration. It is preferably provided that the holding devices are initially moved from the first joining configuration into the second joining configuration before the holder assembly is moved into the application position.

In the second joining configuration, the adhesive-tape sections therefore form the continuous and closed adhesive-tape web, in that the first adhesive end joining surfaces bear against the second adhesive end joining surfaces in the second joining configuration. This creates a material bonding between the adhesive-tape sections, allowing the adhesive-tape web to provide a sealing effect comparable to one-piece sealing elements known from the prior art which are produced by stamping. In particular, it has been found that the continuous and closed adhesive-tape web produced according to the present invention provides a particularly effective seal against dust and fluids, such as water, in particular when the adhesive-tape web is arranged between two substrates and is materially bonded to them. This is particularly advantageous when the adhesive-tape web, together with the two substrates, encloses a cavity and seals it off from the environment, preventing dust and fluids from the environment from entering the cavity. The present invention has, in particular, the advantage over one-piece sealing elements known from the prior art which are produced by stamping, that adhesive-tape sections can be used in the present invention, so that the material waste that occurs during stamping can be avoided, making it particularly resource-efficient. Furthermore, the adhesive-tape web can be formed by the second joining configuration, before the adhesive-tape sections are applied to a substrate surface, so that an advantageous sealing effect between the first and second adhesive end joining surfaces is guaranteed.

The present invention therefore provides a particularly advantageous sealing effect in a particularly resource-efficient manner.

In one embodiment, each holding device of the holding devices has a suction device that can be subjected to a vacuum, in such a manner that when the suction device of the side of a second main joining surface of the main joining surfaces bears against an adhesive-tape section and is subjected to a vacuum, the holding device holds the adhesive-tape section with the help of the suction device. The suction device can therefore be subjected to a vacuum. In particular, the application of a vacuum by the suction device can be ended, so that the holding of the adhesive-tape sections with the help of the holding devices is ended. An adhesive-tape section can therefore be held with the help of the suction device. Likewise, the adhesive-tape section can be released again with the help of the suction device after being held.

In one embodiment, in the second joining configuration, the adhesive-tape web extends along an adhesive-tape web plane running perpendicular to the application direction. The fact that the adhesive-tape web extends along the adhesive-tape web plane running perpendicular to the application direction means that an adhesive-tape web is provided which can be applied particularly well to a flat surface, such as a flat surface of a substrate, for example.

In one embodiment, in the second joining configuration, at least one adhesive-tape web section is curved, in such a manner that at least one first end joining surface bears against a second end joining surface, in such a manner that both a surface normal of the first end joining surface and a surface normal of the second end joining surface each form an angle with a straight line running perpendicular to the application direction. The fact that the at least one adhesive-tape web section in the second joining configuration is curved means that an at least partially curved adhesive-tape web can be provided. The present invention is preferably not limited to continuous and closed adhesive tape webs extending along a plane. Instead, the present invention also comprises adhesive-tape webs which are curved in design and do not extend along the same plane, at least in sections.

In one embodiment, in the second joining configuration, the adhesive-tape web has the shape of a rectangle or square, as viewed in the direction of the application direction, wherein each side of the rectangle or square is formed by an adhesive-tape section. A rectangle and a square each represent a particularly simple geometry of the adhesive-tape web. Particularly when each side of the rectangle or square is formed by an adhesive-tape section, the adhesive-tape web can easily be formed with the help of four adhesive-tape sections. Preferably, when four adhesive-tape sections are used to form the adhesive-tape web, geometries which are particularly advantageous for displays can be produced in the adhesive-tape web. In particular, when four adhesive-tape sections are used to form the adhesive-tape web, a particularly simple and mechanically robust structure of the application device and, in particular, of the holding devices, can be chosen, since two adjacent holding devices can be provided, in particular, which can each be moved perpendicularly towards one another and away from one another. Particularly preferably, the holding devices can be moved towards one another, in such a manner that two holding devices are provided which can be moved towards one another and away from one another, and two other holding devices are provided which are stationary relative to the base plate of the holder assembly and are not movable with respect to the base plate. This results in a particularly mechanically robust application device, particularly since a total of four holding devices are provided, wherein for two holding devices of these four holding devices, no guides necessary for movement are required.

In one embodiment, the application device comprises a removal device that can be connected to a protective film attached to an adhesive layer of the adhesive-tape section when at least one holding device is holding an adhesive-tape section. With the help of the removal device, the protective film can be held, particularly when the holder assembly is moved out of the application position, so that when the adhesive-tape sections are applied to the substrate, the protective film can be separated from the adhesive layer of the adhesive-tape section.

In one embodiment, when each holding device is holding an adhesive-tape section, the removal device can be connected to each protective film attached to an adhesive layer of an adhesive-tape section of the adhesive-tape sections. The protective films can be held with the help of the removal device, particularly when the holder assembly is moved out of the application position, so that when the adhesive-tape sections are applied to the substrate, the protective films can be separated from the adhesive layer of the adhesive-tape section.

In one embodiment, the application device comprises an output device that can provide the adhesive-tape sections. For example, the adhesive-tape sections can be provided on a carrier tape by the output device. The fact that the application device comprises the output device means that the adhesive-tape sections can, in particular, be provided automatically.

According to a second aspect of the invention, the object referred to above is achieved by a robot. The robot has a frame and an application device mounted on the frame according to the first aspect of the invention. The robot may be a portion of a manufacturing system. In particular, it is provided that the robot has a robotic arm. The robotic arm is preferably attached to the frame of the robot. The robotic arm may be attached to the frame of the robot at a first end. At a second end, the robotic arm may be attached to the application device, allowing the application device to be moved relative to the frame. For example, the holder assembly can be moved between the receiving position and the application position with the help of the robotic arm.

The features, technical effects, and/or advantages described in connection with the application device according to the first aspect also apply, at least analogously, to the robot according to the second aspect of the invention, which means that there is no need for the description to be repeated at this point.

According to a third aspect of the invention, the object referred to above is achieved by a manufacturing system. The manufacturing system comprises a robot according to the second aspect of the invention. The manufacturing system may have further components in addition to the robot.

For example, the adhesive-tape sections can be provided on a carrier tape by the dispensing device. Having the dispensing device in the manufacturing system allows the adhesive-tape sections to be supplied particularly automatically. Particularly when both an output device and a dispensing device are provided, different adhesive-tape sections, in particular those with different designs, can easily be provided simultaneously and received by the holder assembly together, in particular simultaneously, as the adhesive-tape sections are received together, in particular simultaneously, by the holding devices.

In one embodiment, the manufacturing system comprises a camera system that can optically determine the position of each adhesive-tape section when each holding device of the holding devices holds an adhesive-tape section of the adhesive-tape sections. The optically determined position of each adhesive-tape section can be compared with a target position of the adhesive-tape sections. In the event that a target position deviates from an optically determined position by more than a positional threshold value, the corresponding adhesive-tape section can be released from the holding device, and a new adhesive-tape section can be received by the holding device. Similarly, when each holding device holds an adhesive-tape section, the camera system can optically determine the orientation of each adhesive-tape section. The optically determined orientation of each adhesive-tape section can then be compared with a target orientation of the adhesive-tape sections. In the event that the target orientation deviates from the optically determined orientation by more than an orientation threshold value, the corresponding adhesive-tape section can be released from the holding device, and a new adhesive-tape section can be received by the holding device. With the help of the camera system, the position and/or orientation of the adhesive-tape sections can therefore be automatically checked, and an intervention in the application process can be made if necessary. The camera system, which can optically determine the position and/or orientation of each adhesive-tape section, when each holding device of the holding devices is holding an adhesive-tape section of the adhesive-tape sections, can also be referred to as the first camera system.

The manufacturing system preferably comprises a camera system which, when each adhesive-tape section of the adhesive-tape sections has been provided by the output device or the dispensing device, can optically determine the position of each adhesive-tape section. Similar to the case in which each holding device of the holding devices holds an adhesive-tape section of the adhesive tape sections, the optically determined position of each adhesive-tape section can be compared with a target position of the adhesive-tape sections. In this case, the target position can also be referred to as the target position of the adhesive-tape sections provided. In the event that a target position deviates from an optically determined position by more than a positional threshold value, the corresponding adhesive-tape section can be removed, and a new adhesive-tape section can be provided. More preferably, when each adhesive-tape section of the adhesive-tape sections has been provided by the output device or the dispensing device, the camera system can optically determine the orientation of each adhesive-tape section. The optically determined orientation of each adhesive-tape section can then be compared with a target orientation of the adhesive-tape sections. In this case, the target orientation can also be referred to as the target orientation of the adhesive-tape sections provided. If the target orientation deviates from the optically determined orientation by more than an orientation threshold value, the corresponding adhesive-tape section can be removed and a new adhesive-tape section can be provided. With the help of the camera system, the position and/or orientation of the adhesive-tape sections provided can therefore be automatically checked, and intervention in the application process can be made where necessary, particularly before the adhesive-tape sections are received and held by the holding devices, which allows for a particularly time-efficient correction of any faulty positioning and/or faulty orientation of the adhesive-tape sections provided if the adhesive-tape sections are supplied with faulty positioning and/or faulty orientation. The camera system, which can optically determine the position and/or orientation of each adhesive-tape section when each adhesive-tape section of the adhesive-tape sections has been provided by the output device or the dispensing device, may also be referred to as the second camera system. Preferably, the first camera system and the second camera system are different, particularly spatially separate from one another, camera systems, so that the first camera system and the second camera system can be arranged independently of one another.

In one embodiment, the manufacturing system comprises a substrate holder capable of holding a substrate with a substrate surface, wherein when the holder assembly is in the application position and adopts the second assembly configuration, and when the substrate holder holds the substrate, the adhesive tape web bears against the substrate surface with the first main joining surfaces facing in the application direction. In particular, the substrate can be positioned and its position fixed with the help of the substrate holder, particularly when the adhesive-tape web is placed on the substrate surface and pressed onto it.

The features, technical effects, and/or advantages described in connection with the application device according to the first aspect, and in connection with the robot according to the second aspect, also apply at least analogously to the manufacturing system according to the third aspect of the invention, which means that a repetition of the description is omitted at this point.

According to a fourth aspect of the invention, the object referred to above is achieved by a method. The method is intended for joining adhesive-tape sections with the help of an application device according to the first aspect of the invention. The adhesive-tape sections each have an adhesive tape underside and an adhesive tape upper side. The adhesive-tape sections have two adhesive main joining surfaces running parallel to one another, a first main joining surface of which is formed by the adhesive-tape underside and a second main joining surface is formed by the adhesive-tape upper side. The adhesive-tape sections each extend from a first end, where an adhesive first end joining surface arranged transversely to the main joining surfaces is provided, to a second end, where an adhesive second end joining surface arranged transversely to the adhesive bonding surfaces is provided. The first end joining surface and the second end joining surface extend from the first main joining surface to the second main joining surface. The method comprises the following steps: holding the adhesive-tape sections with the help of the holding devices, so that for each adhesive-tape section, a first main joining surface of the main joining surfaces, the first end joining surface, and the second end joining surface of the adhesive-tape section, are exposed; and moving the holding devices with the help of an actuator from a first joining configuration, in which the holding devices are arranged so that when each holding device of the holding devices holds an adhesive-tape section of the adhesive-tape sections, the adhesive-tape sections are arranged spaced apart from one another, to a second joining configuration, in which the holding devices are arranged so that when each holding device of the holding devices holds an adhesive-tape section of the adhesive-tape sections, each first end joining surface bears against a second end joining surface, in such a manner that a first end joining surface bears against each second end joining surface, the first main joining surfaces face in an application direction, and the adhesive-tape sections form a continuous and closed adhesive-tape web.

In one embodiment, the holding of the adhesive-tape sections with the help of the holding devices comprises holding the adhesive-tape sections with the help of the suction devices of the holding devices, wherein each suction device of the side of a second main joining surface of the main joining surfaces bears against an adhesive-tape section and is subjected to a vacuum while holding the adhesive-tape sections.

In one embodiment, the method comprises the following steps: connecting the withdrawal device to a protective film of the adhesive-tape section attached to an adhesive layer of the adhesive-tape section; ending the holding of the adhesive-tape sections with the help of the holding devices; and moving the withdrawal device, so that the protective film is peeled off the adhesive layer in the opposite direction to the application direction.

In one embodiment, the method comprises the following step: providing the adhesive-tape sections with the help of the output device or the dispensing device.

In one embodiment, the movement of the holder assembly takes place from the receiving position to the application position along the application direction.

In one embodiment, the method comprises the following step: optically determining the position of each adhesive-tape section with the help of the camera system when each holding device of the holding devices holds an adhesive-tape section of the adhesive-tape sections. The method preferably comprises the following step: optically determining the position of each adhesive-tape section with the help of the camera system when each adhesive-tape section of the adhesive-tape sections has been provided by the output device or the dispensing device. The optically determined position of each adhesive-tape section can be compared with the target positions of the adhesive-tape sections, similar to the case in which each holding device of the holding devices holds an adhesive-tape section of the adhesive-tape sections. In this case, the target position can also be referred to as the target position of the adhesive-tape sections provided. In the event that a target position deviates from a corresponding optically determined position by more than a position threshold value, the corresponding adhesive-tape section can be removed, and a new adhesive-tape section can be provided. Preferably, the method comprises the following step: optically determining the orientation of each adhesive-tape section with the help of the camera system when each adhesive-tape section of the adhesive-tape sections has been provided by the output device or the dispensing device. The optically determined orientation of each adhesive-tape section can then be compared with a target orientation of the adhesive-tape sections. In this case, the target orientation can also be referred to as the target orientation of the adhesive-tape sections provided. In the event that the target orientation deviates from the optically determined orientation by more than an orientation threshold value, the corresponding adhesive-tape section can be removed, and a new adhesive-tape section can be provided. With the help of the camera system, the position and/or orientation of the provided adhesive-tape sections can therefore be automatically checked and an intervention can be made in the application process if necessary, in particular before the adhesive-tape sections are received from the holding devices and held, which allows for a particularly time-efficient correction of any faulty positioning and/or faulty orientation of the adhesive-tape sections provided if the adhesive-tape sections are supplied with faulty positioning and/or faulty orientation.

In one embodiment, the method comprises the following steps: holding a substrate with a substrate surface with the help of the substrate holder; and moving the holder assembly into the application position, so that the adhesive-tape web bears against the substrate surface with the first main joining surfaces facing the application direction.

Although the method steps are described in a specific sequence, the present invention is not limited to this sequence. Instead, the individual method steps can be performed in any meaningful order, including, in particular, at least temporally parallel to one another in sections.

The features, technical effects, and/or advantages described in connection with the application device according to the first aspect, in connection with the robot according to the second aspect, and in connection with the manufacturing system according to the third aspect of the invention also apply at least analogously to the method according to the fourth aspect of the invention, so that there is no need for the description to be repeated at this point.

FIG. 1 shows a schematic view of an embodiment of an application device 1 according to the invention. The application device 1 comprises a holder assembly 3. The holder assembly 3 comprises four holding devices 5. Each holding device 5 of the holding devices 5 has a suction device 7. Each suction device 7 has a plurality of suction grippers 7b which are arranged in a row in the present exemplary embodiment for each suction device 7. The suction grippers 7b are coupled with a vacuum generator capable of applying a vacuum to the suction grippers. The application device 1 has a withdrawal device with withdrawal elements 7a. Each withdrawal element 7a is formed by a suction gripper 7b. Each suction device 7 has a withdrawal element 7a, which is arranged at one end of the row of suction grippers 7b. The present embodiment has a vacuum generator with which the suction grippers can be individually subjected to a vacuum. In particular, the suction grippers that do not form a withdrawal element 7a, and the suction grippers that form a withdrawal element 7a, can be subjected to a vacuum independently of one another. Furthermore, the application device 1 has an output device. The output device is not shown in FIG. 1. The application device 1 can be attached to a frame of a robot. The frame of the robot is not shown in FIG. 1. The robot can form a section of a manufacturing system. In addition to the output device, the manufacturing system may also have a dispensing device. Furthermore, the manufacturing system may have a camera system. Additionally, the manufacturing system may have a substrate holder.

Figure 2:
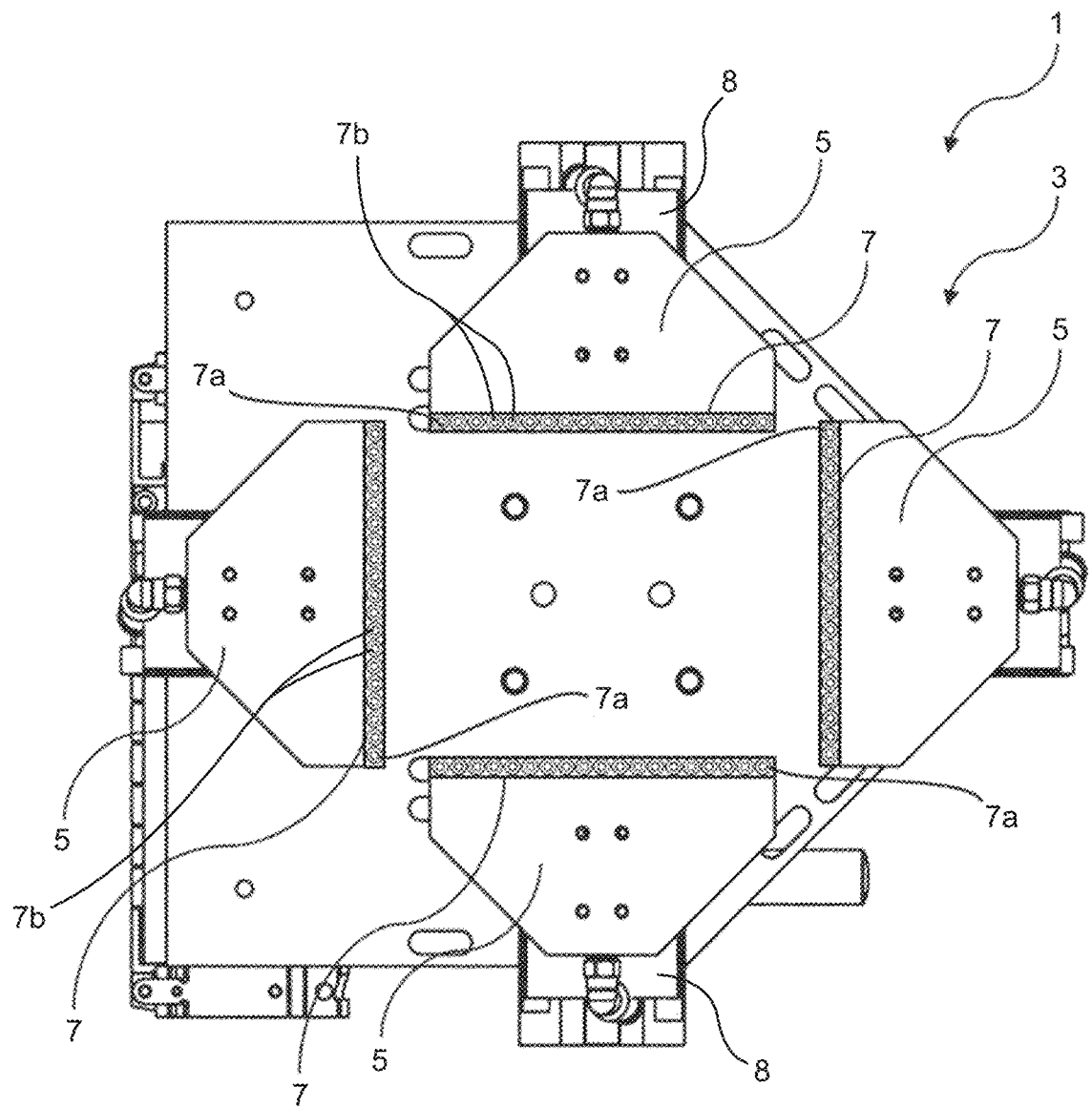
FIG. 2 shows a schematic view from below of the embodiment of the application device depicted in FIG. 1, wherein holding devices of the application device are in a first joining configuration.
Figure 3:
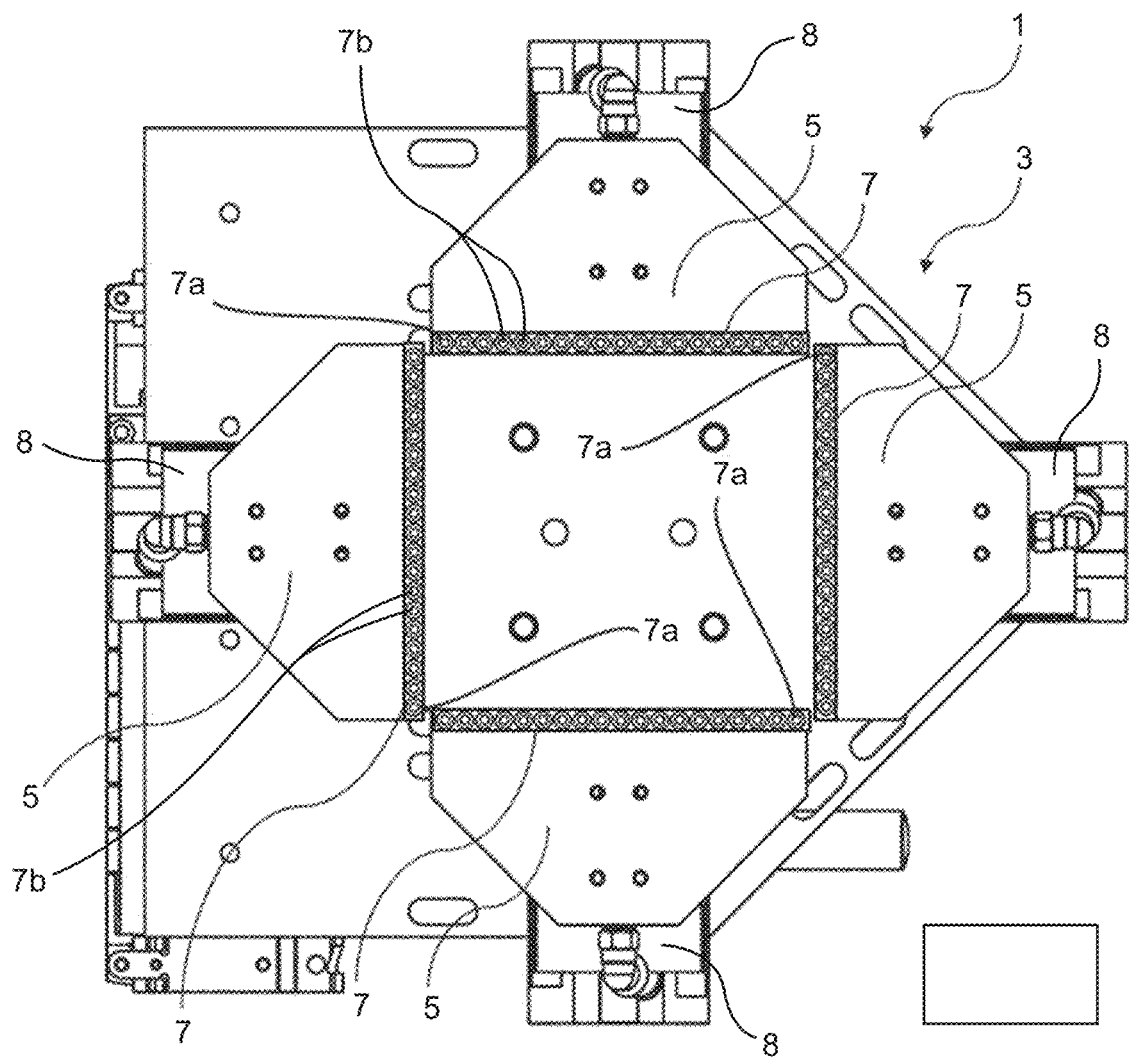
FIG. 3 shows a schematic view from below of the embodiment of the application device depicted in FIG. 1, wherein the holding devices of the application device are in a second joining configuration.
Figure 4:
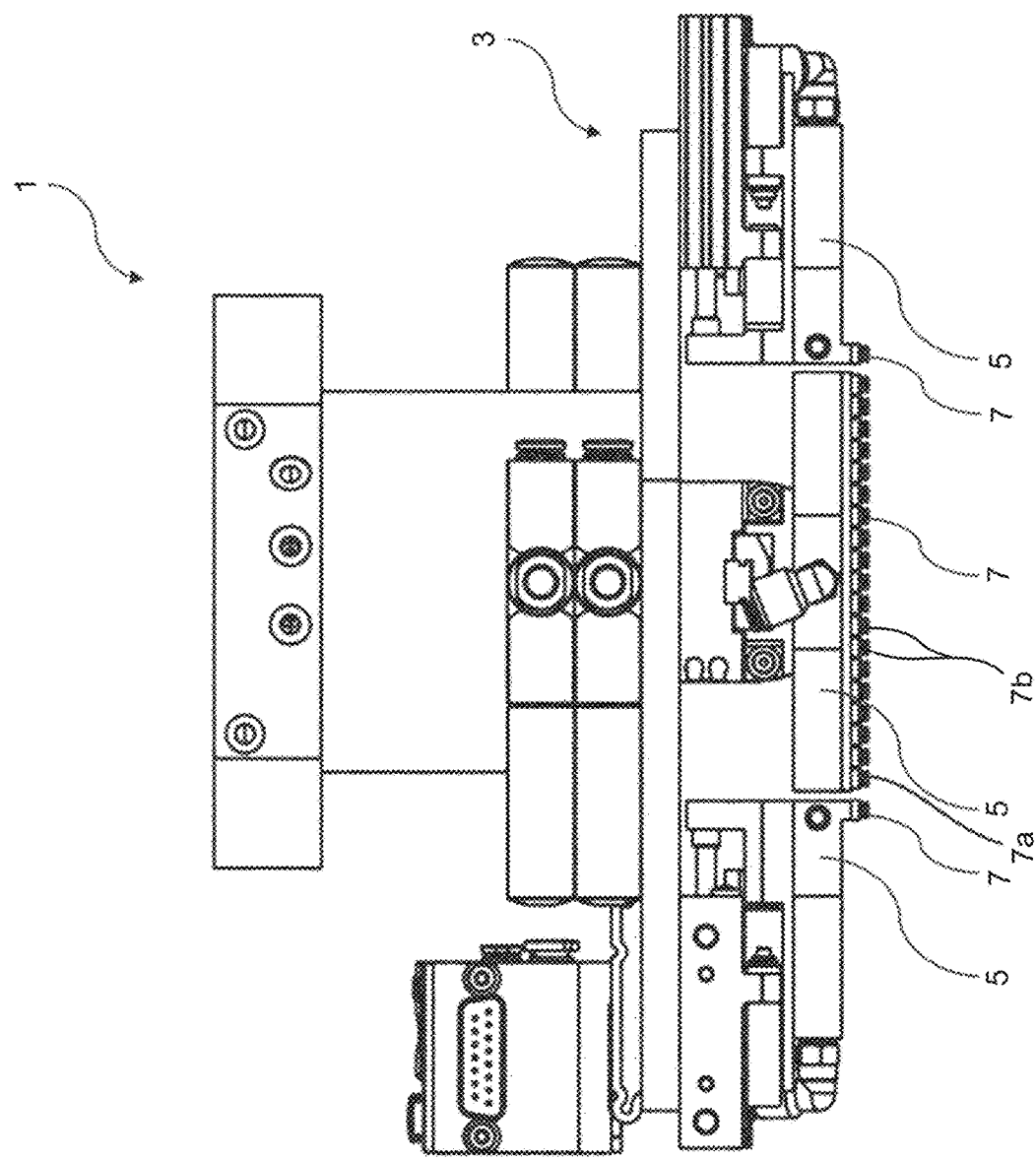
FIG. 4 shows a schematic side view of the embodiment of the application device depicted in FIG. 1.

FIG. 2 shows a schematic view from below of the embodiment of the application device 1 according to the invention in FIG. 1, wherein the holding devices 5 of the application device 1 are in a first joining configuration. FIG. 3 shows a schematic view from below of the embodiment of the application device 1 according to the invention in FIG. 1, wherein the holding devices 5 of the application device 1 are in a second joining configuration. The holding devices 5 are movable relative to one another. The holding devices 5 can be moved between the first joining configuration shown in FIG. 2 and the second joining configuration shown in FIG. 3. The holding devices 5 can also be moved from the first joining configuration shown in FIG. 2 to the second joining configuration shown in FIG. 3, and also from the second joining configuration shown in FIG. 3 to the first joining configuration shown in FIG. 2. In order to move the holding devices 5, the application device has four actuators 8. Each holding device 5 is associated with one of the four actuators 8, so that the holding devices 5 can be moved relative to one another independently of one another. FIG. 4 shows a schematic side view of the embodiment of the application device 1 according to FIG. 1, as comprising a holder assembly 3.

FIG. 5 and FIGS. 6A, 6B, and 6C each show a schematic view of adhesive-tape sections 9 that can be joined with the help of the embodiment of the application device 1 according to the invention in FIG. 1 and with the help of the method according to the invention. The adhesive-tape sections 9 are shown in different positions during an embodiment of the method according to the invention.

Figure 5:
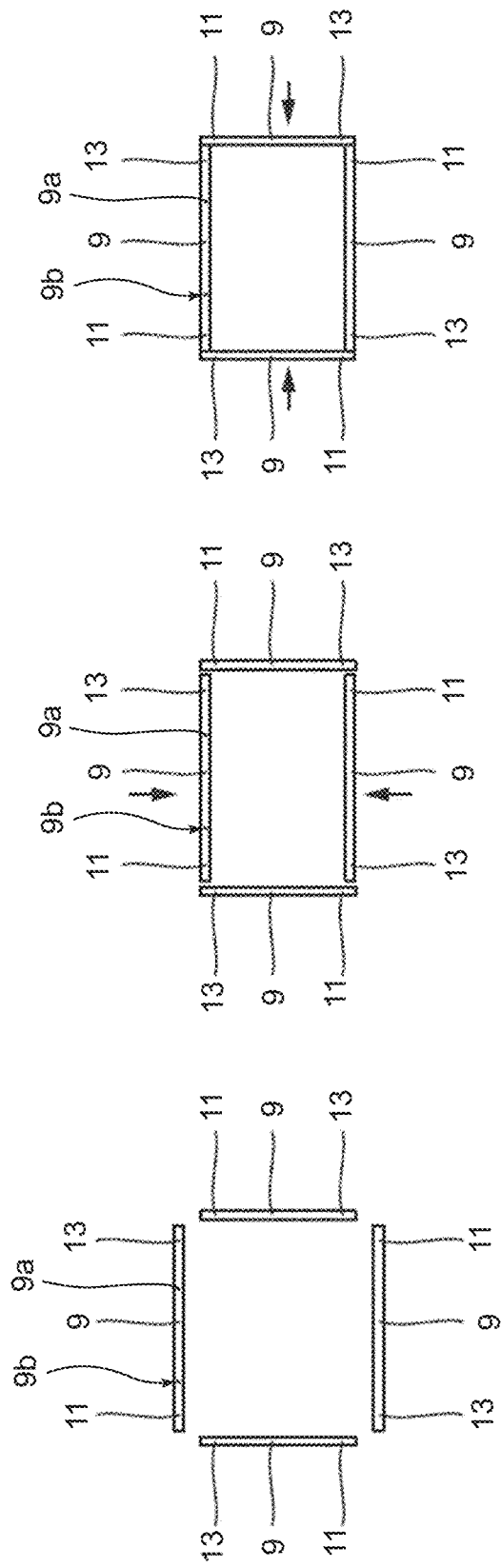
FIG. 5 shows a schematic view of adhesive-tape sections that can be joined with the help of the embodiment of the application device depicted in FIG. 1 and with the help of a method according to the disclosure, wherein the adhesive-tape sections are shown in different positions during an embodiment of the method according to the disclosure.

Each adhesive-tape section 9 of the adhesive-tape sections 9 has an adhesive-tape underside 9b and an adhesive-tape upper side 9a. In FIG. 5 and in FIGS. 6A, 6B, and 6C, the adhesive-tape upper sides 9a of the adhesive-tape sections 9 face away from the viewing direction and are therefore made visible in FIG. 5 and in FIGS. 6A, 6B, and 6C.

Figure 6A:
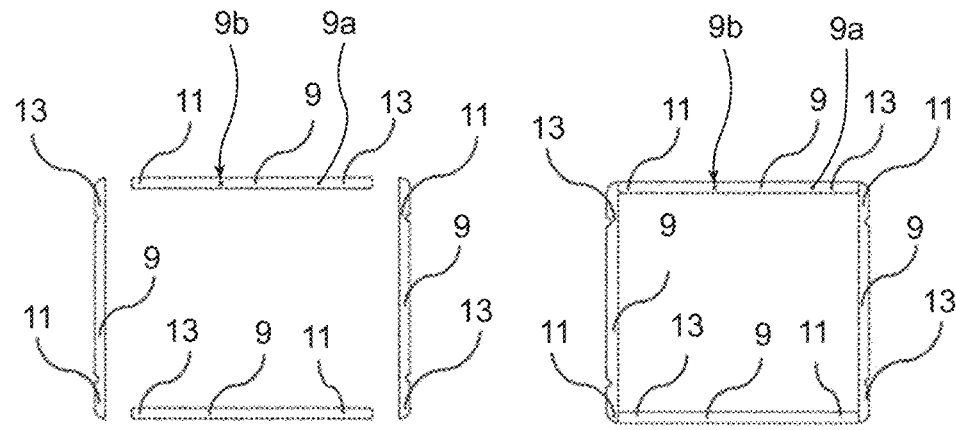
FIGS. 6A, 6B, and 6C show schematic views of adhesive-tape sections that can be joined with the help of the embodiment of the application device depicted in FIG. 1 and with the help of the method according to the disclosure, wherein the adhesive-tape sections are each shown in different positions during an embodiment of the method according to the disclosure.
Figure 6B:
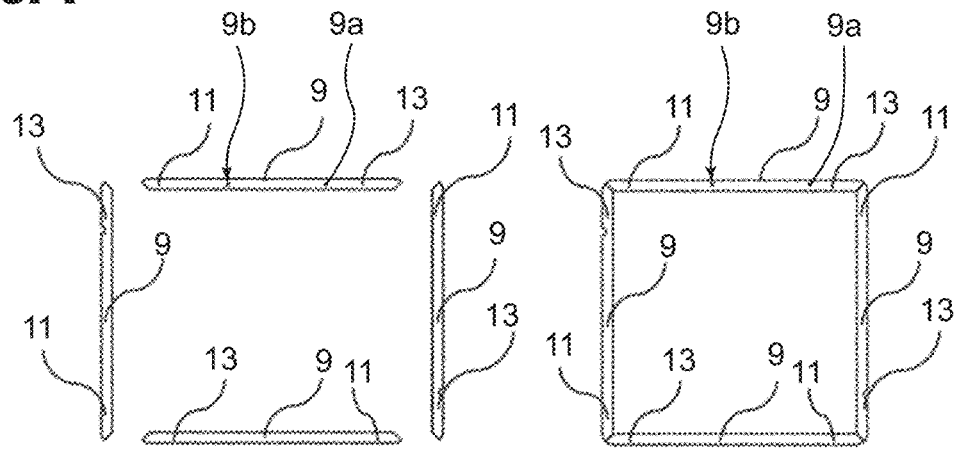
Figure 6C:
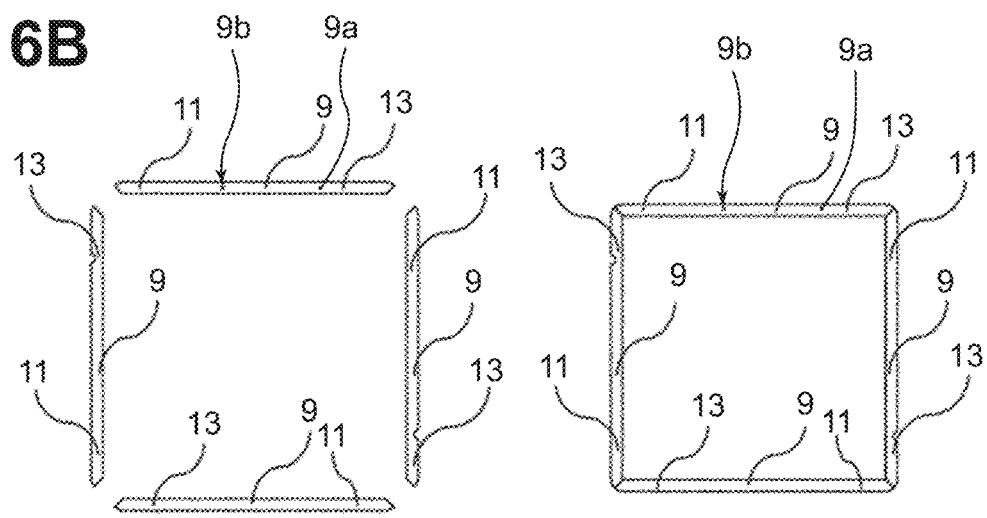

Furthermore, in FIG. 5 and in FIGS. 6A, 6B, and 6C, the adhesive-tape undersides 9b of the adhesive-tape sections 9 face in the viewing direction and are not therefore visible in FIG. 5 and in FIGS. 6A, 6B, and 6C or are covered by the adhesive-tape sections 9 themselves. An application direction is provided which is arranged perpendicular to the image plane in FIG. 5 and perpendicular to the image plane in FIGS. 6A, 6B, and 6C, and faces in the viewing direction in each case. The adhesive-tape undersides therefore face in the application direction.

Each adhesive-tape section 9 has two adhesive main joining surfaces running parallel to one another. The main joining surfaces include a first main joining surface and a second main joining surface. The first main joining surface is formed by the adhesive tape underside. The second main joining surface is formed by the adhesive tape upper side. Furthermore, each adhesive-tape section 9 extends from a first end 11 to a second end 13. At the first end 11, a first end joining surface is provided, which is adhesive and arranged transversely to the main joining surfaces. At the second end 13, a second end joining surface is provided, which is also adhesive and arranged transversely to the main joining surfaces. Both the first end joining surface and the second end joining surface each extend from the first main joining surface to the second main joining surface.

In the arrangement of the adhesive-tape sections 9 shown on the left side of FIG. 5, the holding devices 5 are in the first joining configuration (see FIG. 2), and in the arrangement of the adhesive-tape sections 9 shown on the right side of FIG. 5, the holding devices 5 are in the second joining configuration (see FIG. 3). In the arrangement of the adhesive-tape sections 9 shown in the middle of FIG. 5, the holding devices 5 are in a configuration between the first joining configuration and the second joining configuration (see FIGS. 2 and 3). During the joining of the adhesive-tape sections 9, the holding devices 5 in the arrangement of the adhesive-tape sections 9 shown in the middle of FIG. 5 have already been moved from the first joining configuration and will be moved to the second joining configuration next. In the arrangement of the adhesive-tape sections 9 shown on the left side in FIGS. 6A, 6B, and 6C, the holding devices 5 are in the first joining configuration (see FIG. 2), and in the arrangement of the adhesive-tape sections 9 shown on the right side in FIGS. 6A, 6B, and 6C, the holding devices 5 are in the second joining configuration (see FIG. 3).

Figures 7, 7A:
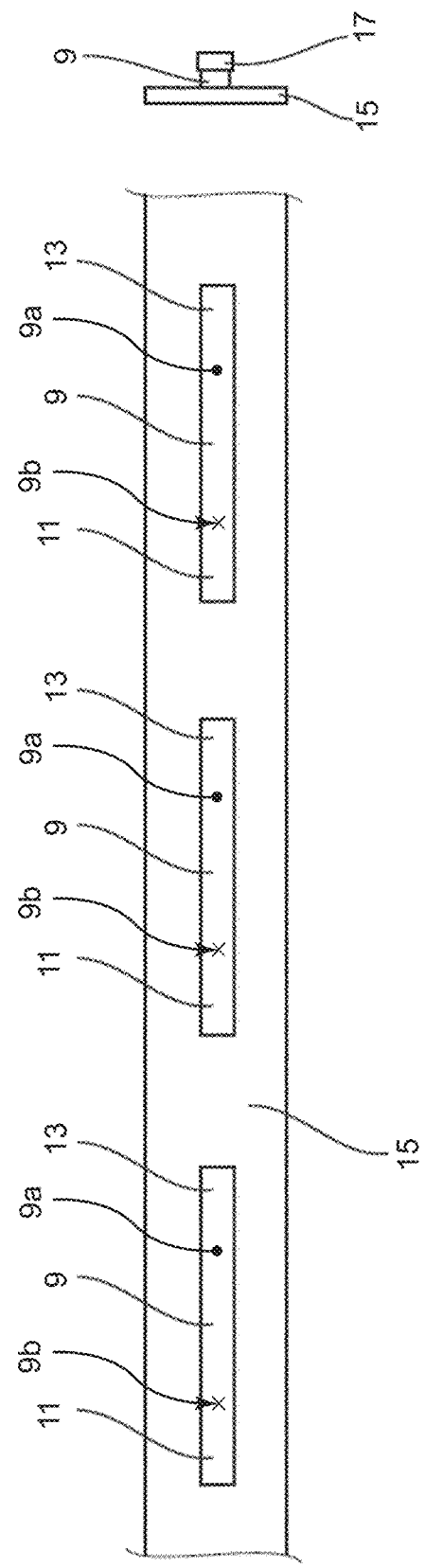
FIGS. 7 and 7A show a schematic view of adhesive-tape sections that can be joined with the help of the embodiment of the application device depicted in FIG. 1 and with the help of the method according to the disclosure, wherein the adhesive-tape sections are shown during the provision of an embodiment of the method according to the disclosure.

FIG. 7 shows a schematic view of adhesive-tape sections 9 that can be joined with the help of the embodiment of the application device 1 according to the invention in FIG. 1 and with the help of the method according to the invention. The adhesive-tape sections 9 are depicted in FIG. 7 during the provision of an embodiment of the method according to the invention. As already described, each of the adhesive-tape sections 9 extends from a first end 11 to a second end 13. The adhesive-tape sections 9 shown in FIG. 7 are arranged on a carrier tape 15. Each adhesive-tape section 9 of the adhesive-tape sections 9 has a protective film 17, as shown in the sectional view FIG. 7A. As already described, each adhesive-tape section 9 has an adhesive-tape underside 9b and an adhesive-tape upper side 9a. A first main joining surface is formed by the adhesive-tape underside 9b. A second main joining surface is formed by the adhesive-tape upper side 9a. The first main joining surface and the second main joining surface are adhesive. The first main joining surface and the second main joining surface can each form an area of an adhesive layer (of the same or a different kind). In FIG. 7, each adhesive-tape section 9 is attached to the carrier tape 15 with the first main joining surface. Furthermore, each adhesive-tape section 9 is attached to the protective film 17 with the second main joining surface. In other words, a protective film 17 is attached to the second main joining surface of each adhesive-tape section 9. In the example shown in FIG. 7, the adhesive-tape sections 9 have an adhesive layer made of acrylic foam. An adhesive layer made of acrylic foam has the advantage that compared with other adhesive layers, the adhesive properties of acrylic foam can be provided for a wide variety of differently shaped surfaces for corresponding applications, making adhesive-tape sections 9 with an adhesive layer made of acrylic foam versatile in application. Therefore, each protective film 17 is attached to the adhesive layer of an adhesive-tape section 9.

As previously described, the application device 1 is designed for joining adhesive-tape sections 9. The application device 1 comprises the holder assembly 3. The holder assembly 3 can be moved between a receiving position and an application position. In the receiving position, adhesive-tape sections 9 can be received from the holder assembly 3 with the help of the holding devices 5 in such a way that, once the adhesive-tape sections 9 have been received, one adhesive-tape section 9 is held by each holding device 5. The holding devices 5 can be subjected to a vacuum in order to hold the adhesive-tape sections 9. A vacuum generator, such as a vacuum pump, can be provided for applying a vacuum. When the suction devices 7 bear against the adhesive-tape sections 9 from the side of the second main joining surface (i.e., as defined/formed by the adhesive upper side 9a) and are subjected to a vacuum, the holding devices 5 hold the adhesive-tape sections 9 with the help of the suction devices 7. With the received adhesive-tape sections 9, the holder assembly 3 can be moved from the receiving position into the application position. In the application position, the adhesive-tape sections 9 can be applied to a substrate with the help of the holder assembly 3, in that the holding devices 5 press the adhesive-tape sections 9 onto the substrate and then release the adhesive-tape sections 9, so that when the holder assembly 3 is moved back from the application position, the adhesive-tape sections 9 remain on the substrate.

As also described earlier, the holder assembly 3 in turn has the four holding devices 5, wherein the holding devices 5 are movable relative to one another. Each holding device 5 can hold an adhesive-tape section 9 in such a manner that the first main joining surface (i.e. as formed/defined by the adhesive underside 9b), the first end joining surface, and the second end joining surface of the adhesive-tape section 9 are exposed. The holding devices 5 can be moved between the first joining configuration and the second joining configuration with the help of the actuator 8.

In the first joining configuration, the holding devices 5 are arranged in such a way that when each holding device 5 holds an adhesive-tape section 9, the adhesive-tape sections 9 are arranged spaced apart from one another. In particular, when the holder assembly 3 is in the receiving position, the holding devices 5 are in the first joining configuration. As has already been described, FIG. 2 shows the holding devices 5 in the first joining configuration. Likewise, as has already been described earlier, the arrangement of the adhesive-tape sections 9 shown on the left side in FIG. 5 shows a situation in which the holding devices 5 are in the first joining configuration. Furthermore, as has likewise already been described, the arrangements of the adhesive-tape sections 9 shown on the left side in FIGS. 6A, 6B, and 6C also show a situation in which the holding devices 5 are in the first joining configuration.

In the second joining configuration, the holding devices 5 are arranged in such a manner that when each holding device 5 holds an adhesive-tape section 9, each first end joining surface bears against a second end joining surface, in such a manner that a first end joining surface bears against each second end joining surface, the first main joining surfaces (i.e., as formed/defined by the adhesive underside 9*b*) face the application device, and the adhesive-tape sections 9 form a continuous and closed adhesive-tape web. In particular, when the holder assembly 3 is in the application position, the holding devices 5 are in the second joining configuration. In particular, it is provided in connection with the present invention that the holding devices 5 are first moved from the first joining configuration into the second joining configuration, and then the holder assembly 3 is moved into the application position. As described earlier, FIG. 3 shows the holding devices 5 in the second joining configuration. Likewise, as has already been described, the arrangement of the adhesive-tape sections 9 shown on the right side of FIG. 5 shows a situation in which the holding devices 5 are in the second joining configuration. Furthermore, as has likewise already been described, the arrangements of the adhesive-tape sections 9 shown on the right side in FIGS. 6A, 6B, and 6C also show a situation in which the holding devices 5 are in the second joining configuration. In FIGS. 5, 6A, 6B, and 6C, in the right-most representation in each case, the adhesive adhesive-tape webs extend along an adhesive-tape plane running perpendicular to the application direction. In particular, in the second joining configuration, at least one adhesive-tape web section may be curved, in such a manner that at least one first end joining surface bears against a second end joining surface, in such a manner that both a surface normal of the first end joining surface and a surface normal of the second end joining surface each form an angle with a straight line running perpendicular to the application direction. In the right-most representation in FIG. 5, the adhesive-tape web has the shape of a rectangle, as viewed in the direction of the application direction. Each side of the rectangle is formed by an adhesive-tape section 9, wherein the adhesive-tape sections 9 form a continuous and closed adhesive adhesive-tape web 9. In the right-most representations in FIGS. 6A, 6B, and 6C, each adhesive adhesive-tape web, as viewed in the direction of the application direction, has the shape of a square. Each side of the corresponding square is formed by an adhesive-tape section 9. Here, too, the adhesive-tape sections 9 each form a continuous and closed adhesive-tape web 9.

As has already been described, the application device 1 may include the withdrawal device. When at least one holding device 5 holds an adhesive-tape section 9, the withdrawal device can be connected to a protective film 17 of the adhesive-tape section 9, said protective film 17 being attached to the adhesive layer of the adhesive-tape section 9 (see FIG. 7A). For example, each holding device 5 may have a withdrawal element 7*a* of the withdrawal device, which is movable together with the holding device 5. Each withdrawal element 7*a* can be connected to the protective film 17 of the adhesive-tape section 9 when the holding device 5 assigned to it holds an adhesive-tape section 9. In particular, the application device 1 may include a withdrawal device which, when each holding device 5 holds an adhesive-tape section 9, can be connected to a protective film 17 attached to the adhesive layer of the adhesive-tape section 9. The protective film 17, or protective films 17, can be held with the help of the withdrawal device or with the help of the withdrawal elements 7*a*, particularly when the holder assembly 3 is moved out of the application position, so that when the adhesive-tape sections 9 are applied to the substrate, the protective film 17, or protective films 17, can be released from the adhesive layer of the adhesive-tape section 9 or the adhesive-tape sections.

As also described earlier, the embodiment described in FIGS. 1 to 4 comprises a vacuum generator with which the suction grippers 7*b* can be subjected to a vacuum independently of one another. In particular, the suction grippers 7*b* that do not form a withdrawal element 7*a* and the suction grippers 7*b* that do form a withdrawal element 7*a* can be subjected to a vacuum independently of one another. This allows the application of a vacuum for the suction grippers that do not form a withdrawal element 7*a* to be ended first, and then the application of a vacuum for the suction grippers that do form a withdrawal element 7*a* can be ended. In particular, the application of a vacuum to the suction grippers that do not form withdrawal elements 7*a* can be ended first when the holder assembly 3 is in the application position. When the holder assembly 3 is in the application position, the application of a vacuum to the suction grippers that form withdrawal elements 7*a* is not yet ended. When the holder assembly 3 has been moved out of the application position, the application of a vacuum to the suction grippers that form withdrawal elements 7*a* can be ended, so that the protective film 17 or the protective films 17, which was/were separated from the adhesive layer of the adhesive-tape section 9, or of the adhesive-tape sections 9, by moving the holder assembly 3 out of the application position and applying a vacuum to the suction grippers that form withdrawal elements 7*a*, are released and discarded.

As was likewise described earlier, the application device 1 may include the output device which is not shown. The output device can provide the adhesive-tape sections 9. For example, the adhesive-tape sections 9 can be provided on a carrier tape 15, as shown in FIG. 7. Additionally or alternatively, the manufacturing system may include the dispensing device which is not shown. The dispensing device can likewise provide adhesive-tape sections 9. In particular, the fact that both an output device and a dispensing device can be provided means that in the event that both the output device and the dispensing device are provided, different, in particular differently shaped, adhesive-tape sections 9 can easily be provided simultaneously and received together, in particular simultaneously, from the holder assembly 3, in that the adhesive-tape sections 9 are received together, in particular simultaneously by the holding devices 5.

Furthermore, the manufacturing system, which comprises the robot with the frame and the application device attached to the frame, may have the camera system which is not shown. The camera system can determine optically the position of each adhesive-tape section 9 when each holding device 5 of the holding devices 5 holds an adhesive-tape section 9. The optically determined position of each adhesive-tape section 9 can then be compared with a target position of the adhesive-tape section 9. In the event that the target position deviates from the optically determined position by more than a position threshold value, the corresponding adhesive-tape section 9 can be released from the holding device 5, and a new adhesive-tape section 9 can be received by the holding device 5. Similarly, when each holding device 5 holds an adhesive-tape section 9, the camera system can optically determine the orientation of each adhesive-tape section 9. The optically determined orientation of each adhesive-tape section 9 can then be compared with a target orientation of the adhesive-tape section 9. In the event that the target orientation deviates from the optically determined orientation by more than an orientation threshold value, the corresponding adhesive-tape section 9 can be released from the holding device 5, and a new adhesive-tape section 9 can be received by the holding device 5. With the help of the camera system, the position and/or orientation of the adhesive-tape sections 9 can therefore be automatically checked and an intervention in the application process can be made if necessary. In addition, the manufacturing system may include the substrate holder which is not shown. The substrate holder can hold a substrate with a substrate surface. When the holder assembly 3 is in the application position and adopts the second joining configuration, and when the substrate holder holds the substrate, the adhesive-tape web with the first main joining surfaces facing in the application direction bears against the substrate surface.

As described earlier, the adhesive-tape sections 9 can be joined with the help of the application device 1 by implementing the method according to the invention. In one embodiment, the method according to the invention comprises the following steps: First, a substrate with a substrate surface is provided. The substrate which is provided is moved to the substrate holder. The substrate is then held with the help of the substrate holder. The adhesive-tape sections 9 are then provided with the help of the output device or the dispensing device. The holding devices 5 are moved into the first joining configuration with the help of the actuator 8. The holder assembly 3 is moved into the receiving position in order to receive the adhesive-tape sections 9. When the holder assembly 3 is in the receiving position, each suction device 7 is arranged on the side of the second main joining surface of an adhesive-tape section 9. Each suction device 7 bear against the corresponding adhesive-tape section 9 from the side of the second joining surface and has a vacuum applied to it. The application of a vacuum to the suction devices 7 ensures that the adhesive-tape sections 9 are held with the help of the holding devices 5. The adhesive-tape sections 9 are held with the help of the holding devices 5, in such a manner that for each adhesive-tape section 9, the first main joining surface, the first end joining surface, and the second end joining surface of the adhesive-tape section 9 are exposed. Next, the withdrawal device is connected to the protective films 17, each of which is attached to an adhesive layer of an adhesive-tape section. In the present exemplary embodiment, each withdrawal element 7a, which is formed by a suction gripper, is brought into contact with a corresponding protective film 17, and a vacuum is then applied to each withdrawal element 7a.

Next, the holder assembly 3 is moved out of the receiving position. When the holder assembly 3 is moved out of the receiving position, the adhesive-tape sections 9 are held with the help of the holding device 5. In this case, the holding devices 5 are in the first joining configuration, in which the holding devices 5 are arranged in such a manner, that the adhesive-tape sections 9 are arranged spaced apart from one another. By arranging the adhesive-tape sections 9 spaced apart from one another, it is ensured that the adhesive-tape sections 9 do not touch one another. When the holder assembly 3 is moved out of the receiving position, the adhesive-tape sections 9 are moved with the help of the application device 1.

In particular, before the holder assembly 3 is in the application position, the holding devices 5 are moved into the second joining configuration. In the second joining configuration, the holding devices 5 are arranged in such a manner that each first end joining surface bears against a second end joining surface, so that a first end joining surface bears against each second end joining surface. Furthermore, in the second joining configuration, the holding devices 5 are arranged in such a manner that the adhesive-tape sections 9 form a continuous and closed adhesive adhesive-tape web. The second joining configuration ensures that the adhesive-tape sections 9 are joined together in such a manner that the adhesive-tape sections 9 form the continuous and closed adhesive adhesive-tape web. In particular, the fact that the adhesive-tape sections 9 form the continuous and closed adhesive-tape web before the holder assembly 3 is in the application position means that the continuous and closed adhesive-tape web can be formed before the adhesive-tape sections 9 lie with the first main joining surfaces on the substrate. This means that the adhesive-tape sections 9 can be joined to one another in the second joining configuration without adhesive forces from the substrate acting on the first main joining surfaces of the adhesive-tape sections 9. Furthermore, the adhesive-tape sections 9 can be optimally positioned relative to one another in the second joining configuration, so that the continuous and closed adhesive adhesive-tape web has an advantageous sealing effect, in particular at the interfaces between the first end joining surfaces and the second end joining surfaces, particularly when the continuous and closed adhesive-tape web is used to seal a cavity between two substrates in respect of the environment.

When the holding devices 5 are in the second joining configuration, the camera system is used to determine the position of each adhesive-tape section 9 optically. The holder assembly 3 is then moved along the application direction to the application position, so that the adhesive-tape web with the first main joining surfaces facing in the application direction bears against the substrate surface. Next, the application of a vacuum by the suction devices 7 is ended, thereby ending the holding of the adhesive-tape sections 9 with the help of the holding devices 5. The holder assembly 3 is then moved out of the application position. During this, the withdrawal device is moved in such a way that the protective films 17 are peeled off from the adhesive layers of the adhesive-tape sections 9 in the opposite direction to the application direction. The application of a vacuum to the suction grippers which form the withdrawal elements 7a can then be stopped, in order to release the protective films 17.

Figure 8:
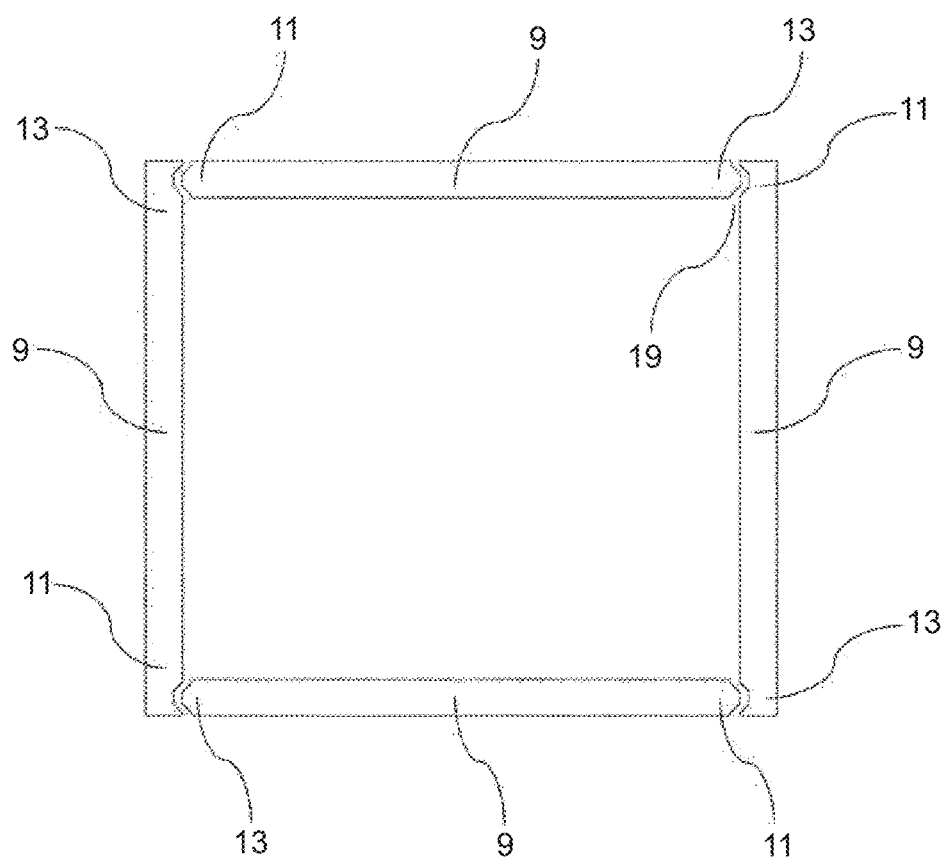
FIG. 8 shows schematic views of adhesive-tape sections that can be joined with the help of the embodiment of the application device depicted in FIG. 1 and with the help of the method according to the disclosure, wherein at least one joining surface of an adhesive-tape section is configured by edges and/or curves in such a manner as to have an uneven and enlarged surface, wherein the opposing joining surface of another adhesive-tape section has a joining surface designed to match it.

FIG. 8 shows schematic views of adhesive-tape sections 9 that can be joined with the help of the embodiment of the application device 1 according to the invention in FIG. 1 and with the help of the method according to the invention. At least one joining surface of an adhesive-tape section 9 is configured by edges and/or curves, so that it has an uneven and enlarged surface 19, wherein the opposite joining surface of another adhesive-tape section 9 has a joining surface corresponding thereto, so that both adhesive-tape sections 9 are joined together to fit perfectly. The joining surfaces can be semi-circular or arcuate, triangular, trapezoidal, or jagged. There is a plurality of possible shapes. By extending the gap line between the joining surfaces, the sealing of the materially bonded connection already described is improved for each pair of adjacent adhesive-tape sections 9. In principle, it can be said that the more complex the gap line, the lesser the fluid communication between the first end joining surface and the second end joining surface of two adjacent adhesive-tape sections 9 in the adhesive adhesive-tape web.

LIST OF REFERENCE SIGNS

1 Application device
3 Holder assembly
5 Holding device
7 Suction device
7a Withdrawal elements
7b Suction grippers
8 Actuators
9 Adhesive-tape section
9a Adhesive-tape upper side
9b Adhesive-tape underside
11 First end
13 Second end
15 Carrier tape
17 Protective film
19 Enlarged surface

The invention claimed is:

1. An application device for joining adhesive-tape sections, comprising:
    a holder assembly having a plurality of holding devices that are movable relative to one another, wherein each holding device is configured to hold an adhesive-tape section in such a way that a first main joining surface, a first end joining surface, and a second end joining surface of the adhesive-tape section are exposed; and
    a plurality of actuators,
    wherein the holder assembly is configured for movement between a receiving position and an application position,
    wherein each of the holding devices is configured for movement between a first joining configuration and a second joining configuration by one of the actuators,
    wherein each adhesive-tape section comprises an adhesive-tape underside, an adhesive-tape upper side, the first main joining surface, and a second main joining surface,
    wherein the first and second main joining surfaces run parallel to one another and extend between a first end and a second end, the first main joining surface defined by the underside and the second main joining surface defined by the upper side,
    wherein the first end comprises the first end joining surface, arranged transversely to the first and second main joining surfaces, and the second end comprises the second end joining surface, arranged transversely to the first and second main joining surfaces, wherein each of the first and second end joining surfaces extends between the first and second main joining surfaces,
    wherein in the first joining configuration, the holding devices are arranged such that each holding device holds an adhesive-tape section and each of the adhesive-tape sections are arranged spaced apart from one another, and
    wherein in the second joining configuration, the holding devices are arranged such that each holding device holds an adhesive-tape section wherein the first end joining surface of the adhesive-tape section bears against the second end joining surface of another adhesive-tape section and the first main joining surface faces an application direction, thus joining the adhesive-tape sections to define a continuous and closed adhesive adhesive-tape web.

2. The application device of claim 1, wherein each holding device comprises a suction device that can be subjected to a vacuum such that the holding device holds one of the adhesive-tape sections.

3. The application device of claim 1, wherein in the second joining configuration, the adhesive-tape web extends along an adhesive-tape web plane running perpendicular to the application direction.

4. The application device of claim 1, wherein in the second joining configuration, at least one section of the adhesive-tape web is curved in such a manner that at least one of the first end joining surfaces bears against a second end joining surface wherein both a surface normal to the first end joining surface and a surface normal to the second end joining surface form an angle with a straight line running perpendicular to the application direction.

5. The application device of claim 1, wherein in the second joining configuration, the adhesive-tape web has the shape of a rectangle or square, as viewed in the application direction, wherein each side of the rectangle or square is defined by an adhesive-tape section.

6. The application device of claim 1, wherein at least one of the end joining surfaces of one of the adhesive-tape sections comprises an uneven and enlarged surface, and further wherein at least one of the end joining surfaces of another adjacent adhesive-tape section has a corresponding uneven and enlarged surface.

7. The application device of claim 1, further comprising:
    a withdrawal device that can be connected to a protective film of one of the adhesive-tape sections when at least one of the holding devices holds one of the adhesive-tape sections,
    wherein the protective film is attached to an adhesive layer of one of the adhesive-tape sections.

8. The application device of claim 7, wherein when each holding device holds one of the adhesive-tape sections, the withdrawal device can be connected to a protective film attached to an adhesive layer of each of the adhesive-tape sections.

9. The application device of claim 1, further comprising:
    an output device that can provide the adhesive-tape sections.

10. A robot, comprising:
    a frame; and
    an application device according to claim 1,
    wherein the application device is mounted on the frame.

11. A manufacturing system, comprising:
    a robot; and
    a dispensing device,
    wherein the robot comprises a frame and an application device according to claim 1,
    wherein the application device is mounted on the frame, and
    wherein the dispensing device is configured to provide each of the adhesive-tape sections.

12. The manufacturing system according to claim 11, further comprising:
    a camera system that can optically determine a position of each of the adhesive-tape sections when each holding device holds one of the adhesive-tape sections.

13. The manufacturing system according to claim 11, further comprising:
    a substrate holder capable of holding a substrate with a substrate surface, wherein when the holder assembly is in the application position and the holding devices adopt the second joining configuration, and wherein when the substrate holder holds the substrate, the adhesive-tape web bears against the substrate surface with the first main joining surfaces facing in the application direction.

14. A method for joining adhesive-tape sections with an application device, wherein each adhesive-tape section comprises an adhesive-tape underside, an adhesive-tape upper side, a first main joining surface, and a second main joining surface, wherein the application device comprises:
- a holder assembly having a plurality of holding devices that are movable relative to one another, wherein each holding device is configured to hold an adhesive-tape section in such a way that the first main joining surface, a first end joining surface, and a second end joining surface of the adhesive-tape section are exposed; and
- a plurality of actuators, wherein the holder assembly is configured for movement between a receiving position and an application position, wherein the method comprises:
- holding the adhesive-tape sections with the plurality of holding devices, so that for each adhesive-tape section, the first main joining surface, the first end joining surface, and the second end joining surface are exposed; and
- moving the plurality of holding devices with the plurality of actuators from a first joining configuration to a second joining configuration, wherein the first joining configuration is such that the holding devices are arranged such that each holding device holds an adhesive-tape section and each of the adhesive-tape sections are arranged spaced apart from one another, wherein the second joining configuration is such that each holding device holds an adhesive-tape section wherein the first end joining surface of the adhesive-tape section bears against the second end joining surface of another adhesive-tape section and the first main joining surface faces an application direction, and wherein the moving step is conducted to join the adhesive-tape sections to define a continuous and closed adhesive-tape web.

15. The method of claim 14, wherein each holding device comprises a suction device and the step of holding is conducted such that each suction device is subjected to a vacuum such that the holding device holds one of the adhesive-tape sections.

16. The method of claim 14, further comprising:
connecting a withdrawal device to a protective film of one of the adhesive-tape sections, the film attached to an adhesive layer of the adhesive-tape section;
ending the step of holding the adhesive-tape sections; and
moving the withdrawal device such that the protective film is peeled off the adhesive layer in the opposite direction to the application direction.

17. The method of claim 14, further comprising:
providing the adhesive-tape sections with an output device or a dispensing device.

18. The method of claim 14, wherein the step of moving the plurality of holding devices is conducted from the receiving position to the application position along the application direction.

19. The method of claim 14, further comprising:
optically determining a position of each of the adhesive-tape sections with a camera system during the step of holding the adhesive-tape sections with the plurality of holding devices.

20. The method of claim 14, further comprising:
holding a substrate with a substrate surface with a substrate holder; and
moving the holder assembly into the application position such that the adhesive-tape web bears against the substrate surface with the first main joining surface facing the application direction.

* * * * *